Patented Aug. 7, 1928.

1,679,994

UNITED STATES PATENT OFFICE.

PHILIP ARTHUR SMITH, OF LONDON, AND HAROLD GREVILLE SMITH, OF STOCKTON-ON-TEES, ENGLAND, ASSIGNORS TO SYNTHETIC AMMONIA & NITRATES LIMITED, OF BILLINGHAM, STOCKTON-ON-TEES, ENGLAND, A BRITISH COMPANY.

MANUFACTURE OF ACETIC ACID AND ACETATES.

No Drawing. Application filed March 10, 1927, Serial No. 174,407, and in Great Britain March 13, 1926.

This invention relates to improvements in the manufacture of acetic acid and acetates.

According to the invention, we bring about a reaction between methanol and sodium formate or between methanol, carbon monoxide and caustic soda.

In the first form of our process, we find it advantageous to conduct the reaction in that the formate is in the molten state while subject to the action of vaporized methanol, and to this end the temperature is to be raised to about 200–300° C., but the temperature should not be higher on account of the increasing tendency for the formate to decompose to give oxalate and hydrogen. If necessary, potassium formate or other suitable substance, e. g. water, may be added to the sodium formate in order to lower its melting point.

It is also advantageous to perform the reaction in the presence of hydrogen, whereby the undesirable decomposition of the formate to oxalate may be inhibited. For example, if the reaction is carried out in an autoclave under pressure, hydrogen under pressure may conveniently be introduced together with the reactants. Gases containing both hydrogen and methanol vapor such as the catalyzed gases from a methanol synthesis plant are particularly suitable for employment in the process of the present invention.

The reaction product obtained consists largely of sodium acetate and may be directly treated by known processes to yield acetic acid.

The sodium formate used in our process is preferably obtained by the action of carbon monoxide upon caustic soda, the crude product from which process can be directly employed.

As regards the second form of our process, we are aware that it has already been proposed to synthesize acids by treating the vapors of aliphatic alcohols with carbon monoxide under pressure and in the presence of catalysts, and it is also known that sodium acetate may be produced by the action of carbon monoxide upon sodium methylate. But we have found that the first of these methods does not lead to any useful results as far as acetic acid is concerned, for the combination of methyl alcohol and carbon monoxide prefers to yield methyl formate instead of the isomeric acetic acid. Nevertheless we have discovered that in the presence of caustic soda or the like base, a satisfactory reaction ensues and sodium acetate can be readily produced. Our process presents considerable advantages over known practice, since sodium methylate is not easy to isolate and of course the sodium used in its manufacture costs more than the equivalent caustic soda employed in our process. It is not necessary that the alcohol should be in a state of purity; for instance the crude methanol obtained by the catalytic hydrogenation of carbon monoxide may be employed without further treatment.

Example 1.

Sodium formate together with a little water is heated to 250–300° C. and a stream of methanol vapor is bubbled through the melt. Sodium acetate is found in the product, in amount depending on the duration of treatment. A few hours' treatment produces a substantial conversion of the formate to acetate.

Example 2.

Crude methanol is introduced into an autoclave together with a slight excess of caustic soda (or soda ash). Carbon monoxide or gas containing same is then pumped in until the partial pressure of carbon monoxide reaches 50 atmospheres. The contents of the autoclave are then raised to a temperature of 200° to 220° and maintained so during two or three hours, at the end of which time the conversion is substantially complete. Excess carbon monoxide is released from the autoclave and the crude sodium acetate removed for purification if necessary. Alternatively sulphuric acid may be added to the contents of the autoclave and the acetic acid distilled off in known manner.

The conditions of pressure and temperature in the above process may be varied within limits. The higher the pressure the greater is the reaction velocity and the shorter is the time required for conversion, but as a rule it is not economical to use a higher pressure than say 50 atmospheres, since the cost of compressing the gas offsets the advantages thereby obtained. As regards temperature, it is preferred to work between 200° C. and 220° C. and in any case not exceeding the critical temperature of methanol (above 240° C.). It is essential that some liquid phase be maintained during the reaction. Gases containing substantial quantities of carbon monoxide, such as water gas, may be used in our process and they do not need to be specially purified. Gas tapped from a methanol synthesis plant which contains hydrogen, carbon monoxide and methanol may also be employed.

Instead of sodium formate or caustic soda in the above processes, other alkali formates or alkali hydroxides may be used.

We use the expression "at least one alkali formate ingredient" to include both an alkali formate and substances capable of generating it e. g. a molten alkali hydroxide in presence of carbon monoxide.

We declare that what we claim is:—

1. Process of producing alkali acetate which comprises causing free methanol to react with at least one alkali formate ingredient.

2. Process of producing alkali acetate which comprises causing free methanol to react with at least one alkali formate ingredient at a temperature of 200°–300° C.

3. Process of producing alkali acetate which comprises leading methanol vapor in contact with a molten alkali formate at 200°–300° C.

4. Process of producing alkali acetate which comprises leading methanol vapor in contact with a molten alkali formate containing substances adapted to lower the melting point at 200°–300° C.

5. Process of producing alkali acetate which comprises leading methanol vapor under a pressure of about 50 atmospheres in contact with a molten alkali formate at 200°–300° C.

6. Process of producing alkali acetate which comprises leading methanol vapor in contact with a molten alkali formate in presence of hydrogen under a pressure of about 50 atmospheres at 200°–300° C.

7. Process of producing alkali acetate which comprises leading methanol vapor under a pressure of about 50 atmospheres in presence of hydrogen under a pressure of about 50 atmospheres in contact with a molten alkali formate at 200°–300° C.

8. Process of producing alkali acetate which comprises passing the gases from a methanol synthesis plant in contact with a molten alkali formate at 200°–300° C.

9. Process of producing an alkali acetate which comprises producing an alkali formate by reaction between carbon monoxide and alkali and reacting upon the crude formate so produced with methanol.

10. Process for producing alkali acetate which consists in subjecting a mixture of methanol and carbon monoxide to a caustic alkali at a pressure of about 50 atmospheres and at a temperature not exceeding 240° C. while maintaining conditions so that some liquid phase is always present.

11. Process of producing an alkali acetate by reacting on a caustic alkali with the reacted gases from a methanol synthesis plant.

In witness whereof, we have hereunto signed our names this 25th day of February, 1927.

PHILIP ARTHUR SMITH.
HAROLD GREVILLE SMITH.